United States Patent Office 3,459,240
Patented Aug. 5, 1969

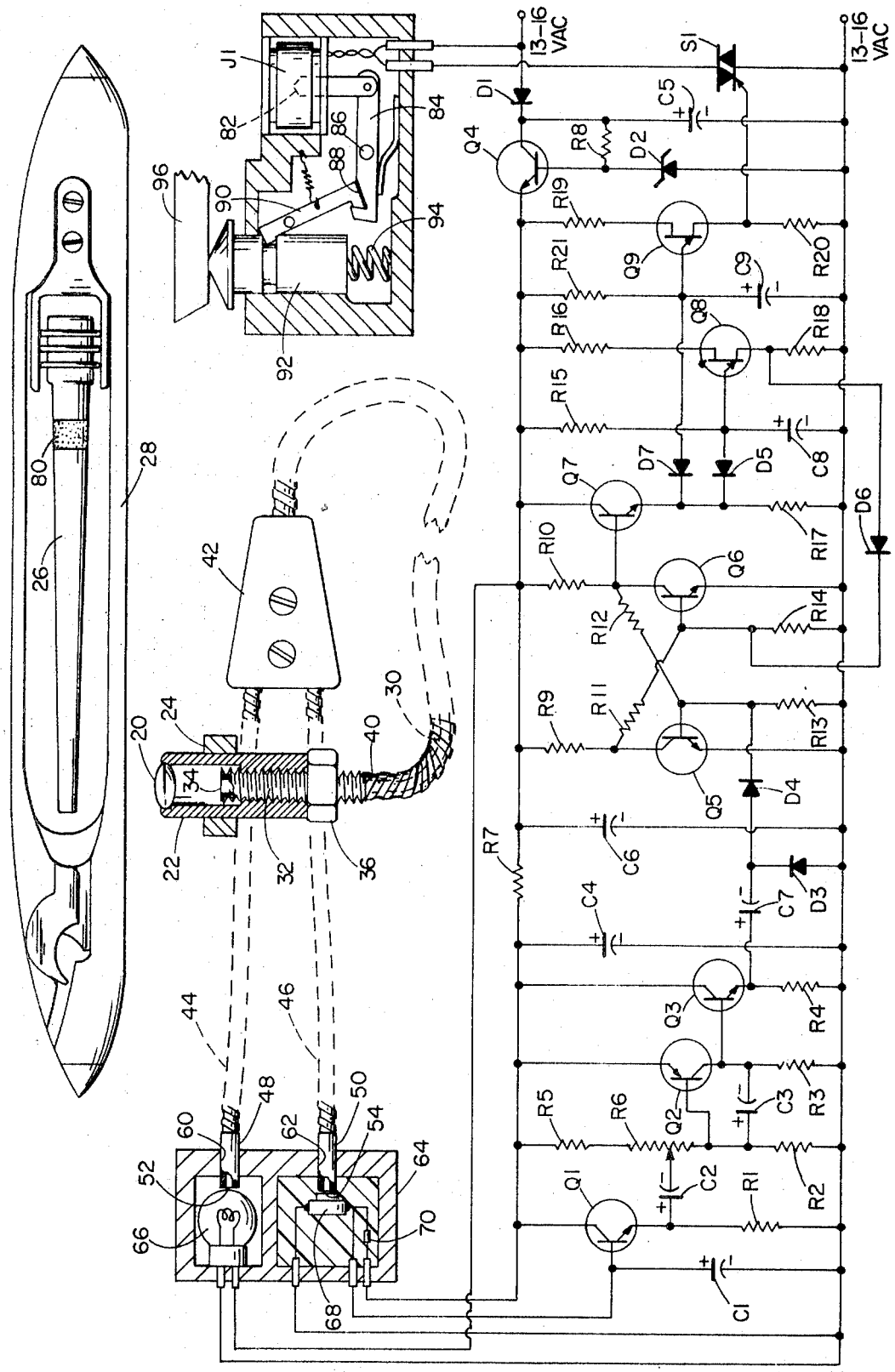
Aug. 5, 1969     G. D. ERICKSON     3,459,240
FIBER OPTIC SENSING, FOR EXAMPLE, OF LOOM BOBBINS
Filed Nov. 21, 1967

3,459,240
FIBER OPTIC SENSING, FOR EXAMPLE, OF LOOM BOBBINS
George Duncan Erickson, Wakefield, Mass., assignor to Dolan-Jenner Industries, Inc., Melrose, Mass., a corporation of Massachusetts
Filed Nov. 21, 1967, Ser. No. 684,743
Int. Cl. D03d 45/10; G02b 5/14
U.S. Cl. 139—273                                 3 Claims

ABSTRACT OF THE DISCLOSURE

Optical reflectivity, e.g. of a bobbin in a loom shuttle, is sensed by passing light through one branch of a bifurcated fiber optic bundle, focusing it upon the object with a lens, catching the reflected light with the lens and passing it through the other branch to a photosensitive device.

---

This invention relates to optical sensing devices useful, e.g., for signalling the emptying of a bobbin of yarn on a loom shuttle.

Objects of the invention are to provide a device that is accurately responsive to changes in light reflectivity at an object; has a high signal to noise ratio; can be easily focused; can be mounted with most of the sensitive components remote from electrical, mechanical, or optical inference; and is easily maintained, reliable, light weight, long lasting, and inexpensive.

The invention features a multiplicity of flexible fiber optic strands bundled together at one end and divided into two branches at the other end, a lens mounted adjacent the first end, a light source mounted adjacent the end of one branch, and a photosensitive device mounted adjacent the end of the other branch to receive light originating at the source, passing through the strands and the lens to the object, and reflected from the object through the lens and the fibers of the other branch. In preferred embodiments the object sensed is a bobbin having a portion of high reflectivity normally covered by yarn or the like; the lens is mounted in a holder screwed onto the end of the fiber bundle and adjustable for focusing; the strands are randomly divided into the two branches so that strands from both branches are intermixed at the lens end; the light source and photosensitive device are mounted remote from the loom; the fibers communicate optically with the lens through a ⅛ inch diameter aperture; the lens is mounted at least 2 inches from the bobbin; and circuitry is provided responsive to the photosensitive device to trigger the loom when light is received reflected from the highly reflective portion of the bobbin.

Other objects, features, and advantages of the invention will appear from the following description of a preferred embodiment thereof, taken together with the partially schematic drawing.

Clear lens 20 (½ inch diameter) is mounted at one end of cylindrical holder 22 supported in split clamp 24 about 2½ inches above bobbin 26 carried by loom shuttle 28. A bundle 30 of 1423 individual strands (each 0.003 inch in diameter) of glass fiber optic material is held together at one end with epoxy and inserted in externally threaded tip 32 having a ⅛ inch aperture 34 in its end. Holder 22 and locking nut 36 are screwed onto tip 32.

Bundle 30 has an overall length of 6 feet and is encased in flexible armored interlock hose 40. The fibers are divided randomly into two equal bundles 5½ feet from tip 32, and the branch joint is protected by metal housing 42. The ends of branches 44 and 46 are epoxied and inserted into tips 48 and 50 having apertures 52 and 54.

Tips 48 and 50 are respectively inserted in openings 60 and 62 in box 64. A lamp 66 (12 volt, 200 milliamps) is supported behind opening 60, and a photo-transistor 68 (General Electric L14B) is potted in epoxy behind opening 62. Thermistor 70 (Victory Engineering Co. 41D2) is connected in series with the collector lead of photo-transistor 68.

The output of photo-transistor 68 is fed to an amplifying circuit which includes transistors Q1 (2N3392), Q2 (MPS6518), and Q3 (2N3392), capacitors C1 (0.01 mfd.), C2 (2.2 mfd.), and C3 (0.1 mfd.), resistors R1 (1K ohms), R2 (47K ohms, R3, 4 (1K ohms), R5 (3.9K ohms) and gain control potentiometer R6 (1K ohms). Resistor R7 (220 ohms) and capacitor C4 (100 mfd.) serve to decouple the amplifying circuit from the power supply circuit including diode D1 (1N4001) and capacitor C5 (1000 mfd.), the voltage of which is regulated by transistor Q4 (Motorola MJE520), diode D2 (Motorola .4M9.1ZS), and resistor R8 (1K ohms). Capacitor C6 (1000 mfd.) is connected to reduce ripple from the power supply.

A timing and control circuit is made up of resistors R9, 10 (each 4.7K ohms), R11, 12 (each 33K ohms), R13, 14 (each 8.2K ohms), R15 (27K ohms), R16 (470 ohms), R17 (1K ohms), and R18 (47 ohms), transistors Q5–7 (each 2N3392), unijunction transistor Q8(2N4870), diodes D3, 4 (each 1N34A), diodes D5, 6 (each 1N4154), and capacitors C7 (0.05 mfd.) and C8 (4.7 mfd.). The amplifier output is fed to diodes D3, 4 through capacitor C7.

Diode D7 (1N4154) is connected to emitter lead of transistor Q7 and, together with unijunction transistor Q9 (2N4870), resistors R19 (470 ohms), R20 (47 ohms), R21 (10K ohms), and capacitor C9 (.05 mfd.) form a pulse generating circuit that feeds triac S1 (Motorola MAC1-2). Triac S1 is connected to one end of solenoid coil J1. The 13–16 volt AC loom power supply is connected to the other end of coil J1 and to triac S1.

A strip 80 of metallized reflective silver colored tape (sold by 3M) is adhered to one end of bobbin 26.

Solenoid core 82 is pivoted to lever 84. Lever 84 is pivoted at 86 and has a notch 88 in which it receives the end of pawl 90 attached to bolt 92. Spring 94 tends to bias bolt 92 against loom actuating lever 96, which controls standard automatic bobbin changing mechanism (not shown).

All the mechanical and electronic cmoponents of the apparatus (except lens holder 22 in clamp 24) are mounted off the loom, and are thus isolated from its mechanical vibrations and electrical transients, as well as being accessible for easy maintenance. Lens 20 and tip 32 are on the loom, but are rigidly connected by holder 22 so that they move together under loom vibration and no distortion is introduced.

In operation, light from lamp 66 passes through half of the fibers in bundle 30, is focused by lens 20 into a narrow beam which is reflected from bobbin 26 each time the bobbin reaches a position beneath lens 20, and is returned through lens 20 and the fibers in branch 46 to impinge upon photo-transistor 68. The light beam focus is easily adjusted by rotation of holder 22 in clamp 24. The random branching of the fibers provides a safety factor for continued operation in case some fibers should become covered. The excellent optical coupling provided by the fibers allows lamp 66 to be run at relatively low power, extending lamp life. When the bobbin is covered with yarn a relatively low amount of light is reflected, but when the yarn is unwound to expose tape 80, the tape reflects a relatively large amount of light, greatly increasing the voltage applied to capacitor C7. This increased voltage is sufficient to flip the flip-flop formed by transistors Q5 and Q6. After a time lag of 175 milli-seconds (determined by the values of R15 and C8) transistor Q8 fires and resets the flip-flop. Prior to this reset, however, transistor Q9 fires repeatedly to produce a series of 0.5 milli-second pulses which are applied to triac S1. These pulses cause triac S1 to energize coil J1. The movement of core 82 pivots lever 84, releasing pawl 90 and allowing spring 94 to raise bolt 92 to initiate the automatic bobbin change. The reset of the flip-flop terminates the firing of transistor Q9, de-energizing coil J1. Lever 96 may be then be returned to its initial position.

Other embodiments will occur to those skilled in the art and are within the following claims.

What is claimed is:

1. Apparatus for detecting a low supply condition on a bobbin in a loom shuttle, said bobbin having a portion of high reflectivity normally covered by weaving material wound thereon, said apparatus comprising:
   a multiplicity of flexible fiber optic strands bundled together at one end and divided into two branches at the other end,
   a connector mounted rigidly on a loom in which said shuttle is operatively disposed,
      said connector carrying a lens,
      said one end of bundled strands being mounted in said connector in a desired optical relationship to said lens, said connector serving to rigidly maintain said relationship despite the mechanical vibrations resulting from operation of said loom,
   a light source mounted adjacent the end of one of said branches, and
   a photosensitive device mounted adjacent the end of the other of said branches to receive light originating at said source, passing through said lens to said bobbin, and reflected from said bobbin through said lens and said strands of said other branch,
      said light source and said photosensitive device being mounted remote from said loom so as to be isolated from the mechanical vibrations and electrical transients produced by operation of said loom.

2. The apparatus of claim 1 wherein said bundled end is secured in an externally threaded tip screwed into said connector, and said branches are respectively inserted in apertures in a housing containing said light source and said photosensitive device optically isolated from each other.

3. The apparatus of claim 1 wherein said strands at said bundled end are in optical communication with said lens through an aperture of about ⅛ inch diameter.

References Cited

UNITED STATES PATENTS

| | | | |
|---|---|---|---|
| 2,431,340 | 11/1947 | Payne | 139—273.1 |
| 2,432,793 | 12/1947 | Payne | 139—273.1 |
| 3,053,139 | 9/1962 | Loepfe | 88—14 |
| 3,238,294 | 3/1966 | Krauss | 350—96 X |
| 3,327,584 | 6/1967 | Kissinger | 88—14 |

FOREIGN PATENTS

| | | |
|---|---|---|
| 826,279 | 12/1951 | Germany. |
| 326,501 | 2/1958 | Switzerland. |

JAMES K. CHI, Primary Examiner

U.S. Cl. X.R.

88—14; 350—96